UNITED STATES PATENT OFFICE.

MARIE SPRINGBORN AND ERICH SPRINGBORN, OF LONDON, ENGLAND.

PROCESS OF MAKING A POLISHING COMPOSITION.

No. 840,167.  Specification of Letters Patent.  Patented Jan. 1, 1907.

Application filed May 20, 1905. Serial No. 261,418.

*To all whom it may concern:*

Be it known that we, MARIE SPRINGBORN and ERICH SPRINGBORN, subjects of the King of Great Britain, residing in the north of London, in the county of Middlesex, England, have invented new and useful Improvements in Processes of Making Polishing Compositions, of which the following is a specification.

This invention relates to a process of making a chemical composition for use in pads for cleaning, staining, and polishing wood, leather, textile, and like manufactured goods.

According to our invention we pour into a suitable closed vessel one hundred and ninety-five parts, by weight, of commercial paraffin-oil whose boiling-point is between 70° and 80°, to which we add four and one-half parts, by weight, of permanganate of potassium in crystals, the paraffin-oil being allowed to stand for a period of about twenty-four hours. The contents of the vessel are occasionally stirred, so as to insure the intimate mixing thereof. We then decant the oxidized paraffin-oil and mix it with an alcoholic solution of asafetida at ordinary temperature while gently stirring the mixture. The alcohol of the said solution forms the carrier which enables the oxidized paraffin-oil to mix intimately with the asafetida. This cold solution is used to saturate slips of porous unsized or unfinished paper or felt.

The alcoholic solution of asafetida is prepared as follows: One ounce asafetida is dissolved in one pound, by weight, of alcohol, mostly methylated spirit. Of this compound, after the asafetida is dissolved, one ounce or more is usually added to one pound of the prepared paraffin-oil previously treated as aforestated.

What we claim as our invention, and desire to secure by Letters Patent of the United States, is—

1. The process for the manufacture of a chemical renovating and polishing preparation, which consists in treating paraffin-oil with permanganate of potassium for twenty-four hours to cause the paraffin-oil to absorb the oxygen given off by the latter and form an oxidized hydrocarbon having cleansing properties, then decanting it and treating it with an alcoholic solution of asafetida.

2. The process of manufacturing a chemical preparation for staining, renovating and polishing vegetable materials and fabrics, which consists in subjecting one hundred and ninety-five parts by weight of paraffin-oil to the action of four and one-half parts by weight of permanganate of potassium in crystals for twenty-four hours, then decanting it, treating it with an alcoholic solution in the proportion of one ounce of asafetida to one pound of alcohol, applied at ordinary temperature, as set forth.

In testimony whereof we have signed our names to this specification in the presence of two subscribing witnesses.

MARIE SPRINGBORN.
ERICH SPRINGBORN.

Witnesses:
J. M. HORSCHEL,
FRANCIS W. FRIGOUT.